(12) United States Patent
Gorny et al.

(10) Patent No.: US 11,811,543 B2
(45) Date of Patent: *Nov. 7, 2023

(54) SYSTEM AND METHOD OF CREATING AND ORGANIZING PRIVATE CHAT MESSAGES

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,721

(22) Filed: Nov. 7, 2022

(65) Prior Publication Data
US 2023/0057496 A1 Feb. 23, 2023

Related U.S. Application Data

(63) Continuation of application No. 17/670,001, filed on Feb. 11, 2022, now Pat. No. 11,496,331, which is a
(Continued)

(51) Int. Cl.
*H04L 12/18* (2006.01)
*G06F 16/31* (2019.01)
(Continued)

(52) U.S. Cl.
CPC .......... *H04L 12/1818* (2013.01); *G06F 16/31* (2019.01); *H04L 12/1822* (2013.01);
(Continued)

(58) Field of Classification Search
CPC ............. H04L 12/1818; H04L 12/1822; H04L 12/1831; H04L 51/216; H04L 51/04; G06F 16/31
See application file for complete search history.

(56) References Cited

U.S. PATENT DOCUMENTS 7,480,259 B2   1/2009   Covell et al.
7,945,620 B2   5/2011   Bou-Ghannam et al.
(Continued)

OTHER PUBLICATIONS

Search Report for Application No. EP20822084 dated Jun. 15, 2023. 7 Pages.
(Continued)

*Primary Examiner* — Blake J Rubin
(74) *Attorney, Agent, or Firm* — Spencer Fane LLP; Steven J. Laureanti

(57) ABSTRACT

A system and method are disclosed for generating a chat space for two or more communication devices using a computer coupled with a database and comprising a processor and memory. The computer generates a chat space and transmits requests to join the chat space to the two or more communication devices. The computer stores in memory identification information for each of the two or more communication devices and one or more public chat messages transmitted between the two or more communication devices. The computer monitors for one or more requests, transmitted from one of the two or more communication devices to the computer, to generate a private thread. In response to one or more requests, the computer generates a private thread, and stores in the computer memory one or more private thread messages transmitted between two or more communication devices in the private thread.

17 Claims, 5 Drawing Sheets

Related U.S. Application Data continuation of application No. 16/845,731, filed on Apr. 10, 2020, now Pat. No. 11,251,982.

(60) Provisional application No. 62/860,409, filed on Jun. 12, 2019.

(51) Int. Cl.
  *H04L 51/04* (2022.01)
  *H04L 51/216* (2022.01)

(52) U.S. Cl.
  CPC .......... *H04L 12/1831* (2013.01); *H04L 51/04* (2013.01); *H04L 51/216* (2022.05)

(56) References Cited

U.S. PATENT DOCUMENTS

| | | |
|---|---|---|
| 8,300,557 B2 | 10/2012 | Sekaran et al. |
| 8,917,847 B2 | 12/2014 | Mai et al. |
| 8,949,357 B2 | 2/2015 | Bradshaw |
| 9,177,328 B2 | 11/2015 | William |
| 9,420,108 B1 | 8/2016 | Bostick et al. |
| 10,403,287 B2 | 9/2019 | Dhoot et al. |
| 10,409,463 B2 | 9/2019 | Chen et al. |
| 10,574,623 B2 | 2/2020 | Geppert et al. |
| 10,725,626 B2 | 7/2020 | Meixner et al. |
| 10,866,929 B2 | 12/2020 | Watanabe et al. |
| 11,217,109 B2 | 1/2022 | Bader-Natal et al. |
| 2007/0299710 A1 | 12/2007 | Haveliwala |
| 2007/0300165 A1 | 12/2007 | Haveliwala |
| 2009/0296608 A1 | 12/2009 | Khan et al. |
| 2011/0268263 A1 | 11/2011 | Jones et al. |
| 2012/0182384 A1 | 7/2012 | Anderson et al. |
| 2013/0246525 A1 | 9/2013 | Patil et al. |
| 2014/0267550 A1 | 9/2014 | Nimri et al. |
| 2015/0188928 A1 | 7/2015 | Shapiro |
| 2017/0032050 A1 | 2/2017 | Kol et al. |
| 2017/0147182 A1 | 5/2017 | Martinazzi et al. |
| 2018/0041461 A1 | 2/2018 | Kurani |
| 2020/0302816 A1 | 9/2020 | Williams et al. |
| 2022/0086393 A1 | 3/2022 | Peters et al. |

OTHER PUBLICATIONS

Examination Report for Application No. GB2118756.2 dated Apr. 6, 2023. 4 Pages.
International Search Report for Application No. PCT/US2020/037194 dated Aug. 18, 2020. 2 Pages.

SYSTEM AND METHOD OF CREATING AND ORGANIZING PRIVATE CHAT MESSAGES

CROSS-REFERENCE TO RELATED APPLICATIONS

This application is a continuation of U.S. patent application Ser. No. 17/670,001, filed on Feb. 11, 2022, entitled "System and Method of Creating and Organizing Private Chat Messages," which is a continuation of U.S. patent application Ser. No. 16/845,731, filed on Apr. 10, 2020, entitled "System and Method of Creating and Organizing Private Chat Messages," now U.S. Pat. No. 11,251,982, which claims the benefit under 35 U.S.C. § 119(e) to U.S. Provisional Application No. 63/860,409 filed Jun. 12, 2019, and entitled "System and Method of Creating and Organizing Private Chat Messages." U.S. patent application Ser. No. 17/670,001, U.S. Pat. No. 11,251,982, and U.S. Provisional Application No. 63/860,409 are assigned to the assignee of the present application.

TECHNICAL FIELD

The present disclosure relates generally to electronic chat-based communication systems and more specifically to creating and organizing private chat messages within chat-based communication systems.

BACKGROUND

Chat-based communication systems may utilize communication networks, including but not limited to the internet, to connect communication systems such as computers, tablet computers, and/or smartphones. Chat systems may permit communication systems to share text-based messages with other communication systems. However, chat systems connecting more than a small number of communication systems may prevent communication systems from easily customizing chat messages (including but not limited to transmitting private chat messages between selected communication systems) and/or from quickly organizing chat messages into specific subject-related topics or threads.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to create and organize private chat messages. Embodiments of the disclosed subject matter include two or more communication devices, including but not limited to tablet computers or smartphones, and a computer coupled with a database and comprising a processor and memory. The computer generates a chat space, including a public chat component and one or more private thread components, and transmits requests to join the chat space to the two or more communication devices. The computer stores in memory identification information for each of the two or more communication devices.

The computer stores in memory one or more public chat messages transmitted between the two or more communication devices in the chat space. The computer monitors for one or more requests, transmitted from one of the two or more communication devices to the computer, to generate a private thread. In response to the one or more requests, the computer generates one or more private threads. The computer stores in memory one or more private thread messages transmitted between two or more communication devices in the private thread.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
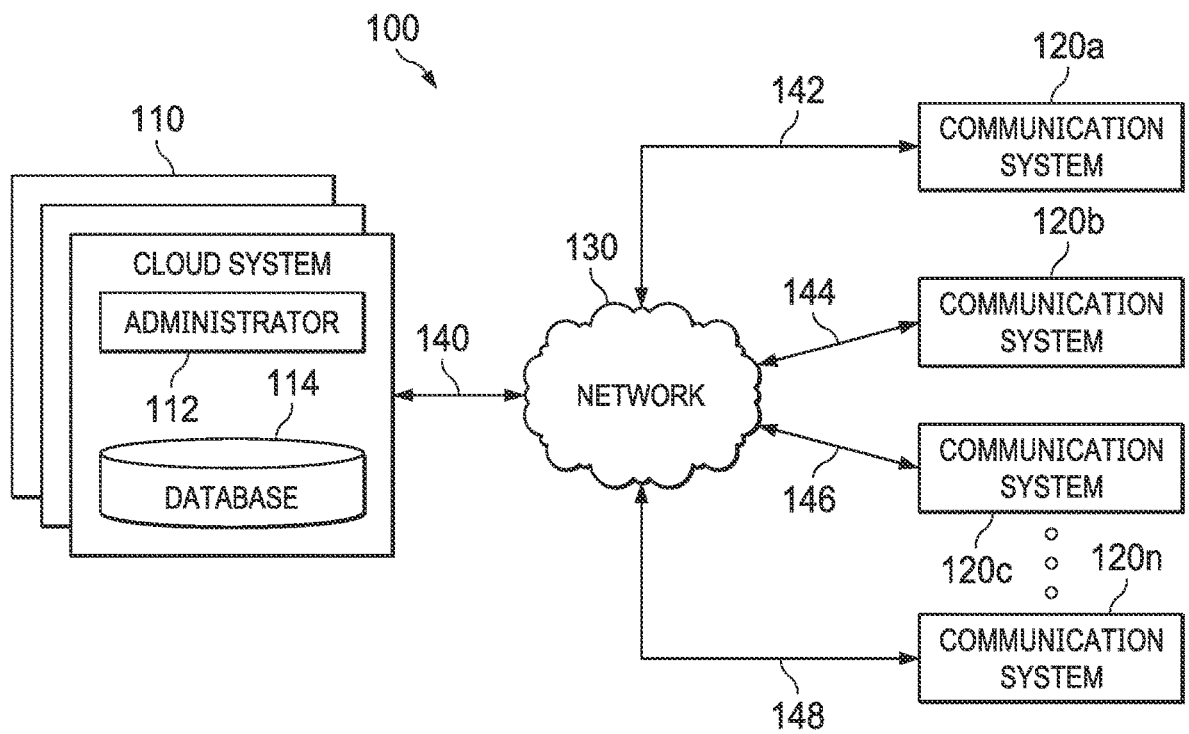
FIG. 1 illustrates an exemplary chat system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, embodiments of the following disclosure relate to creating and organizing private chat messages within chat-based communication systems. Embodiments of the following disclosure generate a chat space that is accessed by a plurality of communication systems, each controlled by an individual user or group of users. Embodiments of the chat space allow communication systems to message other communication systems using text-based or image-based chat messages, and to display the chat messages using a public chat interface visible to all communication systems.

According to an aspect of the disclosure, embodiments generate one or more private threaded chat topics (i.e., threads) within the chat space. Each of the one or more threads allows permitted communication systems to communicate with one another using text-based or imaged-based chat messages within the private thread. Embodiments display the private thread messages using one or more thread interfaces, each of which is visible only to communication systems permitted to participate in the particular thread.

As described in greater detail below, embodiments of the following disclosure allow users to manage public and private chat messages in one-to-one, any-to-any, and one-to-any/any-to-one chat scenarios. Embodiments enable communication systems to quickly organize topics of discussion into specific subject-related threads in which selected communication systems may participate according to one or more public and/or private chat-based communication parameters.

FIG. 1 illustrates exemplary chat system 100, according to a first embodiment. Chat system 100 comprises one or more cloud systems 110, one or more communication systems 120, network 130, and communication links 140-148. Although one or more cloud systems 110, communication systems 120a-120n, single network 130, and communication links 140-148 are shown and described, embodiments contemplate any number of cloud systems 110, communication systems 120, networks 130, or communication links 140-148, according to particular needs.

In one embodiment, cloud system 110 comprises administrator 112 and database 114. Administrator 112 is programmed to generate chat space 202, illustrated by FIG. 2 in block diagram form. One or more communication systems 120 may participate in chat space 202. Administrator 112 is also programmed to generate, in response to requests transmitted by one or more communication systems 120 participating in chat space 202, one or more private threaded chat topics ("threads") within chat space 202, in which only selected communication systems 120 may participate and view chat messages circulated within the one or more threads. Database 114 comprises one or more databases 114 or other data storage arrangements at one or more locations local to, or remote from, cloud system 110. In one embodiment, one or more databases 114 is coupled with the one or more administrators 112 using one or more local area networks (LANs), metropolitan area networks (MANs), wide area networks (WANs), or aforementioned network 130, such as, for example, the Internet, or any other appropriate wire line, wireless link, or any other communication links 140-148. One or more databases 114 store data that is made available to and may be used by one or more administrators 112 according to the operation of chat system 100 described herein. According to embodiments, administrator 112 hosts and runs one or more runtime processes associated with cloud system 110.

According to embodiments, each of one or more communication systems 120 comprises one or more associated users such as, for example, an individual person or customer, one or more employees or teams of employees within a business, or any other individual, person, group of persons, business, or enterprise which communicates or otherwise interacts with one or more communication systems 120.

Although an exemplary number of communication systems 120a-120n are illustrated and described, embodiments contemplate any number of communication systems 120 interacting with network 130 and the one or more cloud systems 110 according to particular needs.

Each of one or more communication systems 120 comprises one or more communication devices, such as, for example, cellular phones or smartphones, desktop computers, laptop computers, notebook computers, tablet-type devices, terminals, or any other communication device capable of receiving, transmitting, and displaying visual information through network 130. In an embodiment, each of the one or more communication devices may comprise an audiovisual recording device, such as a camera and microphone, and an audiovisual display device, such as an electronic display screen and one or more speakers. In addition, each of the one or more communication devices may comprise an input device, such as a keyboard, mouse, or touchscreen.

Each of the one or more communication devices may comprise a processor, memory and data storage. The processor may execute an operating system program stored in memory to control the overall operation of the one or more communication devices associated with each of one or more communication systems 120. For example, the processor may control the reception of signals and the transmission of signals within chat system 100. The processor may execute other processes and programs resident in memory, such as, for example, registration, identification or communication over communication links 142-148, and moving data into or out of the memory, as required by an executing process.

Each of the one or more communication devices that comprise each of one or more communication systems 120 may be coupled with other communication devices, as well as one or more cloud systems 110, by network 130 via communication links 142-148. Although communication links 142-148s are shown connecting each of one or more communication systems 120a-120n to network 130, embodiments contemplate any number of communication links 140-148 connecting any number of communication systems 120 with network 130, according to particular needs. In addition, or as an alternative, communication links 140-148 may connect one or more communication systems 120 directly to one or more cloud systems 110 and/or one or more separate communication systems 120 and/or communication devices.

According to embodiments, one or more communication links 140-148 couple the one or more cloud systems 110, including administrator 112 and database, and one or more communication systems 120 with network 130. Each communication link 140-148 may comprise any wireline, wireless, or other link suitable to support data communications between the one or more cloud systems 110 and network 130. Although communication links 140-148 are shown as generally coupling the one or more cloud systems 110 and one or more communication systems 120 with network 130, the one or more cloud systems 110 and one or more communication systems 120 may communicate directly with each other according to particular needs.

According to embodiments, network 130 includes the Internet, telephone lines, any appropriate LANs, MANs, or WANs, and any other communication network coupling the one or more cloud systems 110 and one or more communication systems 120. For example, data may be maintained by the one or more cloud systems 110 at one or more locations external to the one or more cloud systems 110, and made available to the one or more cloud systems 110 or one or more communication systems 120 using network 130, or in any other appropriate manner.

According to embodiments, the one or more cloud systems 110 and/or one or more communication systems 120 may each operate on one or more computers that are integral to or separate from the hardware and/or software that supports chat system 100. In addition, or as an alternative, the one or more users may be associated with chat system 100 including the one or more cloud systems 110 and/or one or more communication systems 120. These one or more users may include, for example, one or more computers programmed to generate chat space 202 and to generate threads within chat space 202 autonomously. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of chat system 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to chat system 100. The one or more computers also include one or more processors and associated memory to execute instructions and manipulate information according to the operation of chat system 100.

Embodiments contemplate the one or more cloud systems 110 generating chat space 202. Each of the one or more communication devices may connect to the one or more cloud systems 110 using network 130 and communication links 140-148, and may participate in chat space 202. Chat space 202 allows one or more users associated with each of the one or more communication devices to conduct and participate in an ongoing exchange of text-based or image-based chat messages in both a public chat and in one or more private threads.

Figure 2:
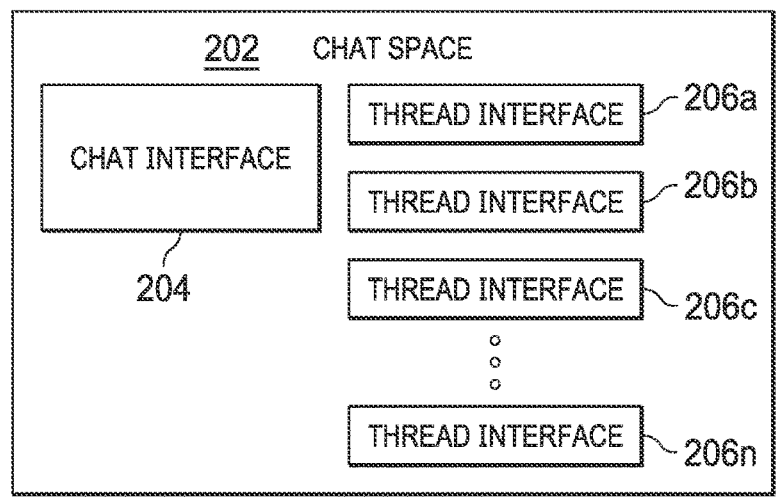
FIG. 2 illustrates an exemplary chat space block diagram, according to an embodiment.

FIG. 2 illustrates exemplary chat space 202 block diagram, according to an embodiment. In the embodiment illustrated by FIG. 2, chat space 202 comprises chat interface 204 and thread interfaces 206a-206n, each of which comprises a particular thread. Although exemplary chat space 202 is illustrated and described comprising single chat interface 204 and thread interfaces 206a-206n, embodiments contemplate chat space 202 comprising any number of chat interfaces 204 and any number of thread interfaces 206 configured in any manner and according to particular needs.

As illustrated by FIG. 2, chat space 202 may comprise chat interface 204. Chat interface 204 permits each of the one or more communication devices, and the one or more users associated with each of the one or more communication devices, to send and receive text-based messages, images, and files to and from other communication devices participating in chat interface 204. Communication devices may transmit chat messages to cloud system 110, which may transmit chat interface 204, comprising a visual representation of all public chat messages transmitted by all communication devices, to each of the one or more communication devices participating in chat space 202. Each of the one or more communication devices may display chat interface 204, in the form of chat interface display 602 illustrated by FIG. 6, using one or more associated audiovisual display devices. Chat interface 204 permits each of the one or more communication devices to display and visualize text-based messages and images transmitted within chat space 202 without privacy restrictions.

According to embodiments and described in greater detail below, the one or more cloud systems 110 also generate, upon request from the one or more communication devices, one or more threads within chat space 202. Each thread comprises a private threaded chat topic, in which selected communication devices may exchange chat messages, images, saved files and documents, and other information, privately without these messages and files being shared in the general chat interface amongst all communication devices participating in chat space 202. Cloud system 110 may generate, for each of the one or more threads, thread interface 206 and/or thread interface display 802, illustrated by FIG. 8, which displays the chat messages and other information shared between communication devices participating in that particular thread.

One or more cloud systems 110 may generate any number of separate threads within chat space 202, with each thread comprising a unique roster of participating communication devices. The one or more cloud systems 110 may permit one or more communication devices to tailor each thread to a particular matter or audience, and to select which of the other one or more communication devices are to be invited to each of the one or more threads. Each thread interface 206 comprises only the chat messages exchanged between the communication devices permitted to participate in the associated thread.

Figure 3:
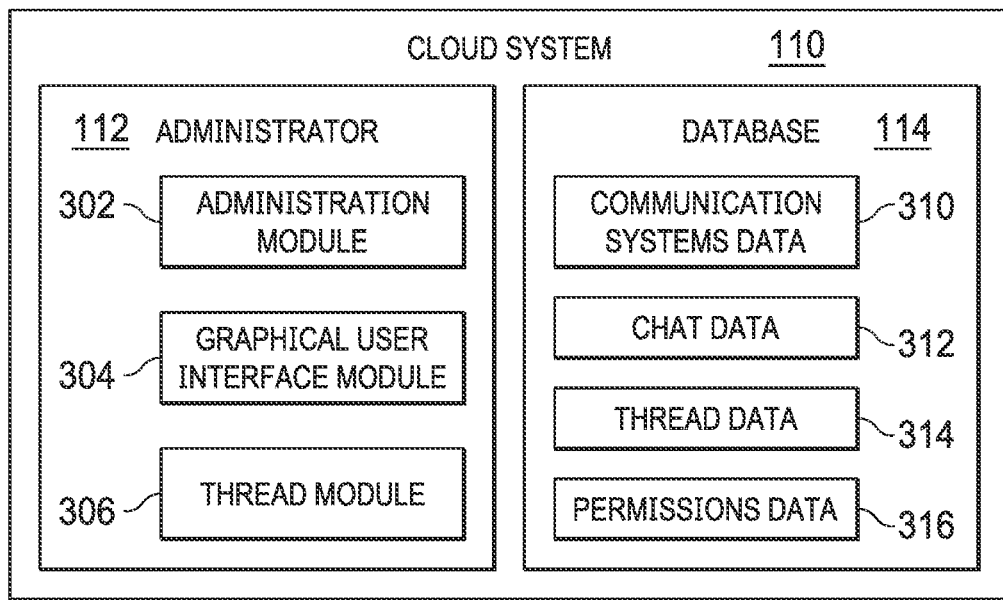
FIG. 3 illustrates the cloud system of FIG. 1 in greater detail, according to an embodiment.

FIG. 3 illustrates cloud system 110 of FIG. 1 in greater detail, according to an embodiment. Cloud system 110 may comprise one or more computers at one or more locations including associated input devices, output devices, non-transitory computer-readable storage media, processors, memory, or other components to send and receive information between one or more communication systems 120 and/or one or more communication devices according to the operation of chat system 100. In addition, and as discussed in more detail below, cloud system 110 comprises administrator 112 and database 114. Although cloud system 110 is described as comprising single administrator 112 and database 114, embodiments contemplate any suitable number of administrators 112 or databases 114 internal to or externally coupled with cloud system 110. In addition, or as an alternative, cloud system 110 may be located internal to one or more communication systems 120. For example, in an embodiment in which one of communication systems 120 is a computer, the computer may also function as cloud system 110 and may generate chat space 202 for other participating communication systems 120. In other embodiments, cloud system 110 may be located external to one or more communication systems 120 and may be located in, for example, a corporate or regional entity of one or more communication systems 120, according to particular needs.

According to embodiments, administrator 112 comprises administration module 302, graphical user interface module 304, and thread module 306. Although a particular configuration of administrator 112 is shown and described, embodiments contemplate any suitable number or combination of administration modules 302, graphical user interface modules 304, thread modules 306, and/or other modules, located at one or more locations, local to, or remote from, cloud system 110, according to particular needs. In addition, or as an alternative, administration module 302, graphical user interface module 304, and thread module 306 may be located on multiple administrators 112 or computers at any location in chat system 100.

According to embodiments, database 114 comprises communication systems data 310, chat data 312, thread data 314, and permissions data 316. Although database 114 is shown and described as comprising communication systems data 310, chat data 312, thread data 314, and permissions data 316, embodiments contemplate any suitable number or combination of communication systems data 310, chat data 312, thread data 314, permissions data 316, and/or other data pertaining to chat system 100 located at one or more locations, local to, or remote from, cloud system 110, according to particular needs.

Communication systems data 310 of database 114 comprises the identification information of one or more communication systems 120 and the one or more communication devices associated with each of one or more communication systems 120. Communication systems data 310 may include, for example, names and addresses of the one or more users associated with each of one or more communication systems 120, company contact information, telephone numbers, email addresses, IP addresses, and the like. According to embodiments, identification information may also comprise information associated with the operating systems of each of one or more communication systems 120, internet browser information regarding each of the one or more communication devices associated with each of one or more communication systems 120, or system specifications (such as, for example, processor speed, available memory, hard drive space, and the like) for each of the one or more communication devices associated with each of one or more communication systems 120.

Communication systems data 310 may also include end user ID information, communication system ID information, communication system MAC address information, or any other type of information which cloud system 110 may use to identify and track each of one or more communication systems 120 and the one or more communication devices that comprise each communication system 120 participating in chat system 100. Communication systems data 310 may further comprise identification data which identifies and tracks each of the one or more communication devices which comprise each of one or more communication systems 120. Although particular communication systems data 310 are described, embodiments contemplate any type of communication systems data 310 associated with one or more communication systems 120 or communication devices, according to particular needs. In one embodiment, cloud system 110 uses communication systems data 310 to identify one or more participating communication systems 120 in chat system 100 in order to generate particular configurations of chat system 100 specific to each communication system. In other embodiments, cloud system 110 uses communication systems data 310 to generate chat space 202 which specifically includes only particular identified communication systems 120, such as in the case of a private chat space.

Chat data 312 of database 114 comprises information regarding chat interface 204 which has no privacy restrictions. Chat data 312 may comprise information, including text messages, images, files, links, emojis, and the like (collectively, a "chat message"), transmitted between communication devices participating in chat interface 204. Cloud system 110 may store a transcript of chat interface 204 and the chat messages transmitted between communication devices in one or more databases 114 associated with chat system 100. One or more cloud systems 110 and/or one or more communication devices may access the chat transcript at a later time.

Thread data 314 of database 114 comprises information regarding one or more threads. The communication devices participating in chat space 202 may transmit requests to generate one or more threads to administration module 302 of administrator 112 using network 130 and communication links 140-148. The communication devices may specify in the requests which of the other one or more communication devices administration module 302 should permit to join the one or more threads. In response, administration module 302 may generate one or more threads, and may allow only the permitted communication devices to participate in the threads. As described in greater detail below, administrator 112 may generate separate thread interface 206 for each of the one or more threads, which the communication devices participating in each of the one or more threads may access. Administrator 112 may store information regarding each of these one or more thread interfaces 206 in thread data 314 of database 114.

In an embodiment, thread data 314 comprises information regarding each of the separate one or more threads, each of which is visible to and accessible by only the communication devices permitted to participate in each thread. Thread data 314 may comprise information specifically associated with each of the one or more threads, including text messages, images, files, links, emojis, chat messages, and the like, transmitted between communication devices participating in the particular thread. Cloud system 110 may store a transcript of the chat messages, files, and other information exchanged between communication devices participating in each of the one or more threads in thread data 314. According to embodiments, selected one or more cloud systems 110 and/or one or more communication devices may access thread transcripts at a later time, such as, for example, only the communication devices which participated in the particular thread.

Permissions data 316 of database 114 comprises information regarding which of the one or more communication devices are permitted to participate in each of the one or more threads within chat space 202. As described in greater detail below, when administrator 112 generates a new thread, administration module 302 may store information regarding which communication devices may participate in the thread in permissions data 316.

Administration module 302 of administrator 112 may configure, update, and/or manage the operation of cloud system 110. In an embodiment, administration module 302 may configure, update, and/or manage the broader operation of chat system 100 and change which data is executed and/or stored on cloud system 110 and/or one or more communication devices. Chat system 100 may comprise a user-configurable system, such that cloud system 110 administrator may store communication systems data 310, chat data 312, thread data 314, and/or permissions data 316 either singularly or redundantly in cloud system 110 database and/or one or more communication devices, according to particular needs. In other embodiments, administration module 302 monitors, processes, updates, creates, and stores communication systems data 310, chat data 312, thread data 314, and/or permissions data 316 in cloud system 110 database, as is further discussed below.

According to embodiments, administration module 302 may generate chat space 202, which one or more communication devices may join. When a communication device joins chat space 202, administration module 302 may record unique identifying information regarding the communication device, such as by assigning the communication device a unique ID or by recording the communication device's IP or MAC address, in communication systems data 310.

Figure 6:
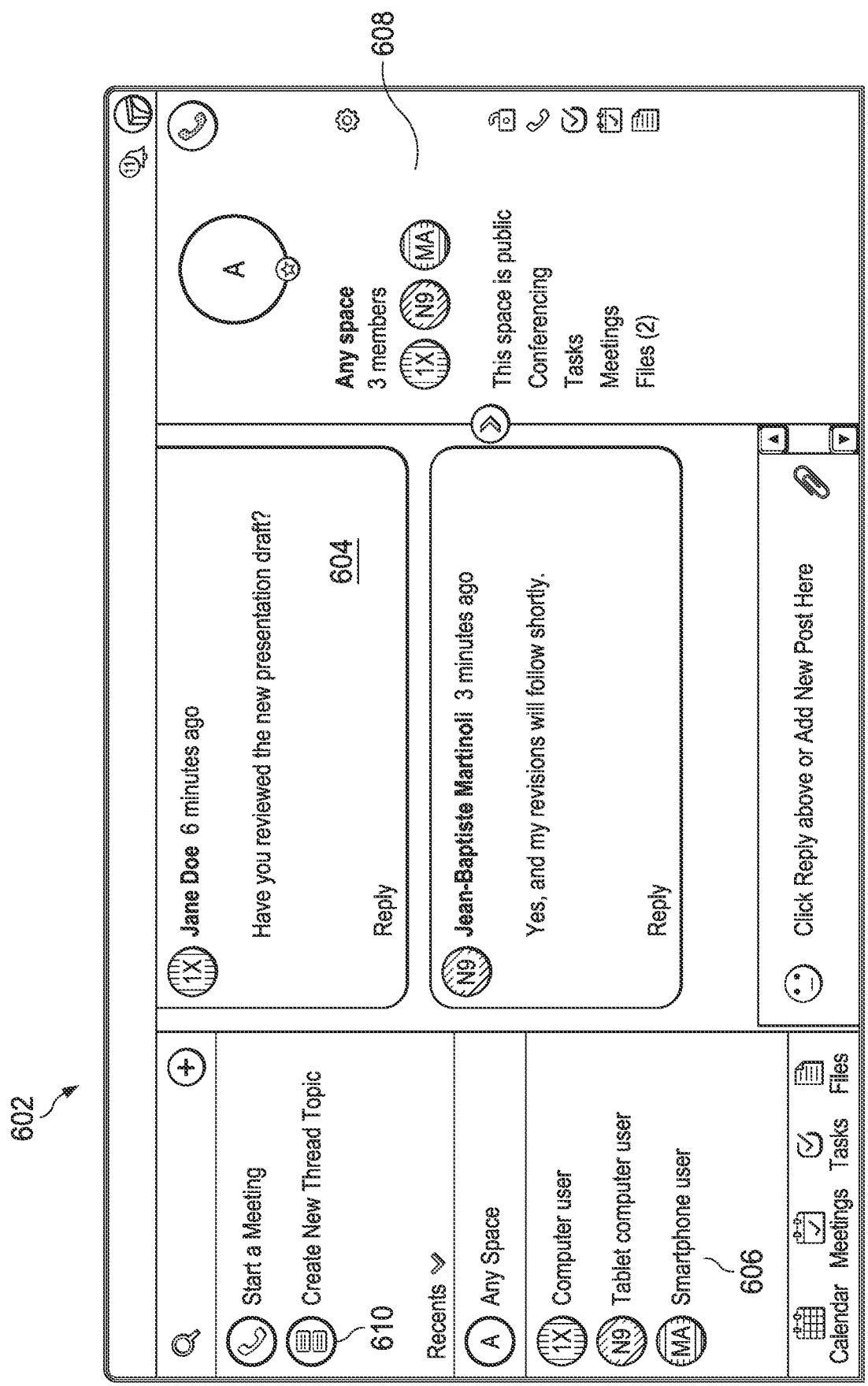
FIG. 6 illustrates an exemplary chat interface display, according to an embodiment.
Figure 8:
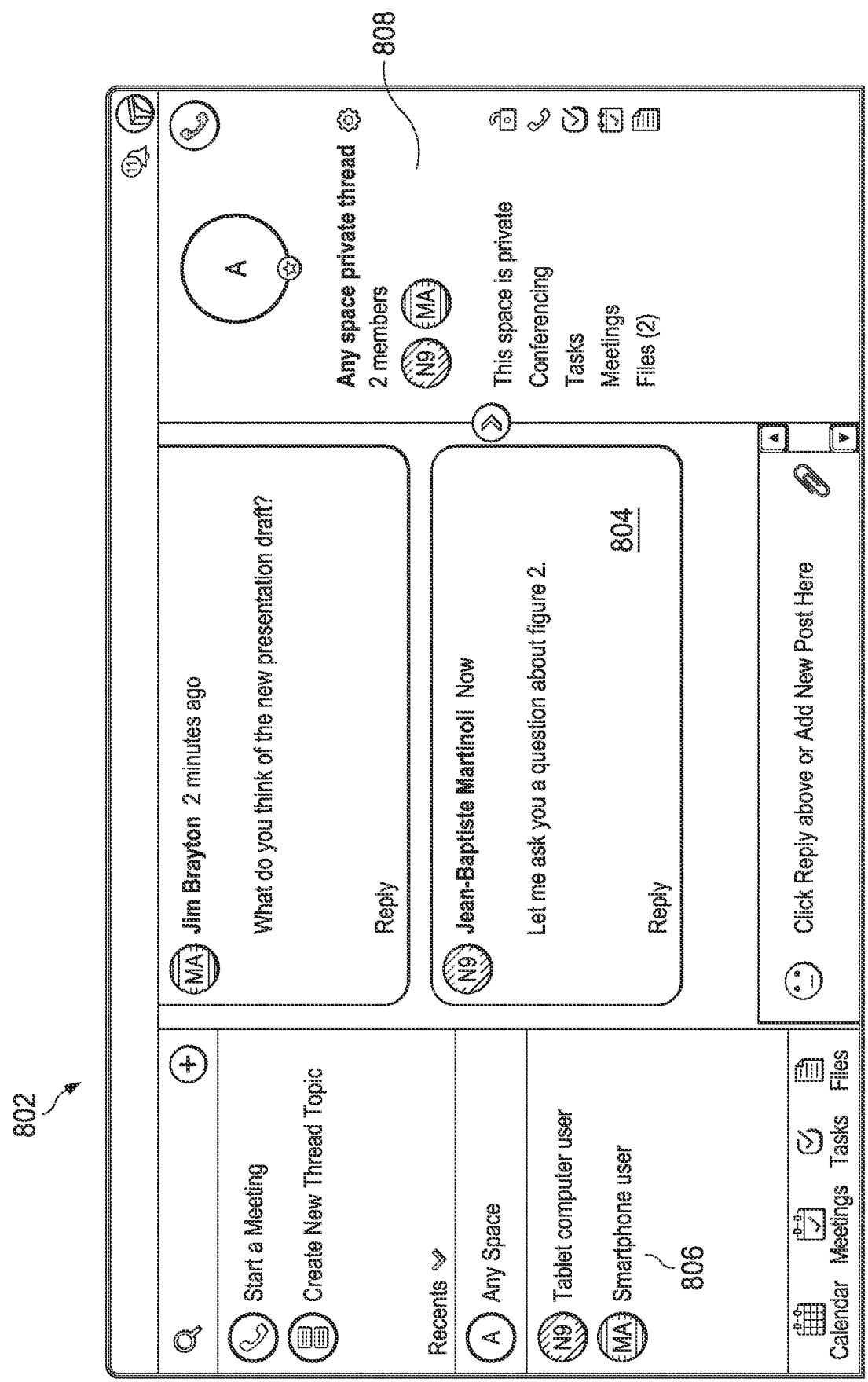
FIG. 8 illustrates an exemplary thread interface display, according to an embodiment.

Graphical user interface module 304 of administrator 112 generates a graphical user interface display comprising and displaying features of communication systems data 310, chat data 312, thread data 314, and permissions data 316, such as, for example, generating a visual representation of chat interface 204 in the form of chat interface display 602, illustrated by FIG. 6, and/or thread interface 206 in the form of thread interface display 802, illustrated by FIG. 8. Graphical user interface module 304 stores and retrieves data from cloud system 110 database including communication systems data 310, chat data 312, thread data 314, and permissions data 316. Graphical user interface module 304 may generate different graphical user interface displays conveying different types of information about chat space 202 and chat interface 204 available to all communication devices.

According to embodiments, administration module 302 may generate chat space 202. Graphical user interface module 304 may access chat data 312 and generate chat interface 204. Administration module 302 may transmit, using network 130 and communication links 140-148, chat interface 204 to the one or more communication devices participating in chat space 202. Each of the one or more communication devices receives chat interface 204 from administration module 302 and displays chat interface 204 on the communication device's audiovisual display device using chat interface display 602. Administration module 302 saves each incoming chat message from the one or more communication devices in chat data 312. Graphical user interface module 304 accesses chat data 312 and generates chat interface 204 displaying the newest chat messages. Administration module 302 transmits chat interface 204, displaying the newest chat messages, to all communication devices participating in chat space 202.

According to embodiments, administration module 302 monitors for requests from the one or more communication devices to generate one or more threads. In response to one or more communication devices transmitting a request to generate a thread over network 130, administration module 302 transmits information regarding the request to thread module 306. Thread module 306 generates one or more unique thread interfaces 206 to permit the selected communication devices to exchange private chat messages in the thread, as described in greater detail below. Administration module 302 transmits thread interface 206 only to the communication devices selected to participate in that particular thread. Thread module 306 stores permission information regarding which of the one or more communication devices may participate in each of the one or more threads in permissions data 316.

Figure 4:
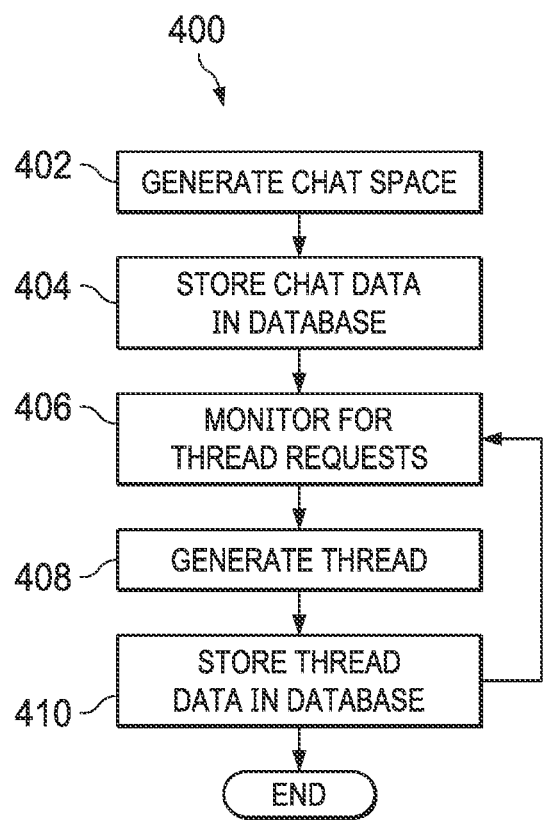
FIG. 4 illustrates an exemplary method of generating a chat space and one or more threaded chat topics, according to an embodiment.

FIG. 4 illustrates exemplary method 400 of generating chat space 202 and one or more threaded chat topics, according to an embodiment. In an embodiment, method 400 of generating one or more threaded chat topics within chat space 202 proceeds by one or more actions, which although described in a particular order may be performed in one or more permutations or alternative orders, according to particular needs.

At action 402 of method 400, administration module 302 generates chat space 202 and transmits requests to join chat space 202 to one or more communication systems 120 and/or the one or more communication devices that comprise each of the one or more communication systems 120. In an embodiment, each of the one or more communication devices that comprises each of the one or more communication systems 120 accepts the request to join chat space 202. Each of the one or more communication devices transmits its acceptance of the request to administration module 302 using network 130 and communication links 140-148. Administration module 302 records unique identifying information regarding each communication device, such as by assigning each communication device a unique ID and by recording the communication device's IP or MAC address, in communication systems data 310. Graphical user interface module 304 generates chat interface 204. Administration module 302 transmits chat interface 204 to each participating communication device. Each participating communication device displays chat interface 204 on its audiovisual display device in the form of chat interface display 602, illustrated by FIG. 6.

At action 404, cloud system 110 stores chat messaged and data in database 114. Each of the one or more communication devices transmits chat messages to administration module 302 using network 130 and communication links 140-148. Administration module 302 stores each chat message in chat data 312 of database 114. Graphical user interface module 304 accesses chat data 312, and generates updated chat interface 204 containing the recently-transmitted chat messages stored in chat data 312. Administration module 302 transmits updated chat interface 204 to each participating communication device. Each participating communication device displays updated chat interface 204 using updated chat interface display 602.

At action 406, administration module 302 continually monitors for requests from each of the communication devices to generate one or more threads. According to embodiments, chat interface display 602 may display a "Create New Thread Topic" button 610 which may permit one or more communication devices to request the generation of one or more threads. In an embodiment, any of the one or more communication devices may transmit a request to generate a new thread to administration module 302. Upon receiving a request from a communication device to generate a new thread, administration module 302 stores the request to generate a new thread, as well as the identity of the communication device that requested the thread creation, in thread data 314. Thread module 306 accesses thread data 314 and generates a thread settings interface, which allows the communication device that requested the generation of a new thread to specify various parameters regarding how the thread will operate, such as, for example, which other communication devices are permitted to participate in the thread. Administration module 302 transmits the thread settings interface to the communication device that requested the generation of the new thread. The communication device that requested the generation of the new thread displays the thread settings interface on its audiovisual display device in the form of thread settings interface display 702, illustrated by FIG. 7. The communication device selects, from thread settings interface display 702, the parameters by which cloud system 110 will generate the new thread, including but not limited to which other communication devices will be invited to participate in the new thread. The communication device transmits the thread settings parameters to administration module 302, which stores the thread settings parameters in thread data 314.

At action 408, thread module 306 accesses the thread settings parameters stored in thread data 314 and generates thread interface 206. Administration module 302 transmits thread interface 206 only to the communication devices that were selected to be invited to participate in the new thread. Each participating communication device displays thread interface 206 on its associated audiovisual display device in the form of thread interface display 802. Each participating communication device may display either chat interface 204 in the form of chat interface display 602, or thread interface 206 in the form of thread interface display 802, on its audiovisual display device, and may switch back and forth between chat interface display 602 and thread interface display 802 in response to input from one or more communication device users.

At action 410, administration module 302 stores each chat message transmitted between communication devices participating in the new thread in thread data 314 of database 114. Thread module 306 accesses thread data 314, and generates updated thread interface 206 containing the recently-transmitted chat messages stored in thread data 314. Administration module 302 transmits updated thread interface 206 to the communication devices participating in the thread, maintaining the privacy of the thread by prohibiting communication device that are not participating in the thread from receiving or accessing the chat messages transmitted between communication devices invited to participate in the thread. Cloud system 110 returns to action 406 and continues to monitor for thread requests, generate threads, and store thread data in database 114 for the duration that chat system 100 generates chat space 202. When all communication devices disconnect from chat space 202, cloud system 110 terminates method 400.

To illustrate chat system 100 executing the actions of method 400 to generate chat space 202 and one or more threaded chat topics, the following example is provided. In this example, chat system 100 comprises cloud system 110, three communication devices (in this example, computer 502, tablet computer 504, and smartphone 506), network 130, and four communication links 140-146. Although a particular number of cloud systems 110, communication devices, networks 130, and communication links 140-146 are illustrated and described, embodiments contemplate any number of cloud systems 110, communication systems 120 and/or communication devices, networks 130, or communication links 140-148, according to particular needs.

Figure 5:
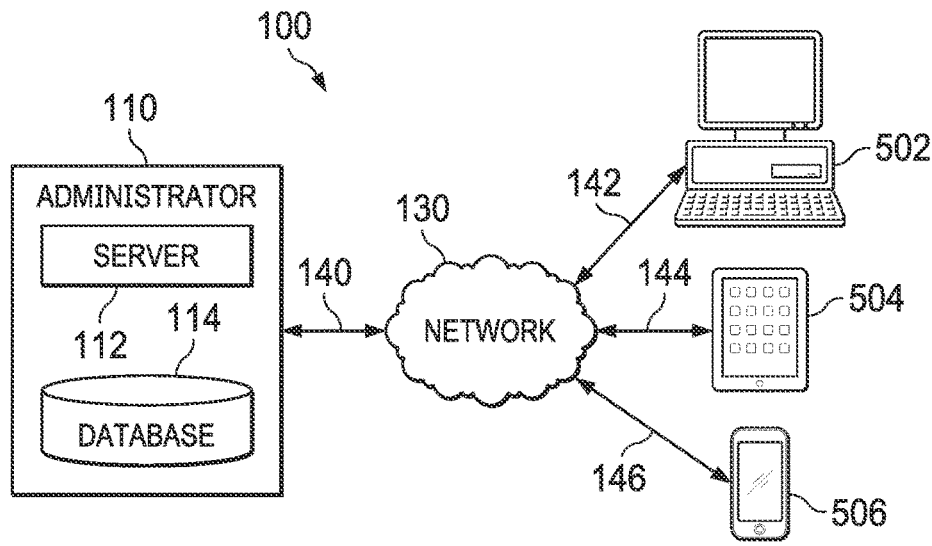
FIG. 5 illustrates an exemplary chat system executing the method of FIG. 4, according to an embodiment.

FIG. 5 illustrates exemplary chat system 100 executing method 400 of FIG. 4, according to an embodiment. Continuing with the example, each of computer 502, tablet computer 504, and smartphone 506 further comprise an audiovisual recording device (comprising a camera and microphone), an audiovisual display device (comprising an electronic display screen and one or more speakers), and an input device (comprising, with respect to computer 502, a keyboard, and with respect to tablet computer 504 and smartphone 506, a touchscreen).

At action 402 of method 400, administration module 302 generates chat space 202 and transmits requests to join chat space 202 to computer 502, tablet computer 504, and smartphone 506. Each of computer 502, tablet computer 504, and smartphone 506 transmits its acceptance of the request to administration module 302. As discussed above, administration module 302 records unique identifying information regarding each of computer 502, tablet computer 504, and smartphone 506, such as by assigning to each of computer 502, tablet computer 504, and smartphone 506 a unique ID and by recording the IP and MAC address of each of computer 502, tablet computer 504, and smartphone 506 in communication systems data 310.

Continuing the example, graphical user interface module 304 generates chat interface 204. Administration module 302 transmits chat interface 204 to each of computer 502, tablet computer 504, and smartphone 506. Each of computer 502, tablet computer 504, and smartphone 506 displays chat interface 204, in the form of chat interface display 602, on an associated audiovisual display device. In this example, each of computer 502, tablet computer 504, and smartphone 506 transmit chat messages to administration module 302 using network 130 and communication links 140-146.

Continuing the example, at action 404, administration module 302 stores, in chat data 312 of database 114, each chat message transmitted to cloud system 110 by computer 502, tablet computer 504, and smartphone 506. Graphical user interface module 304 accesses chat data 312, and generates updated chat interface 204 containing the recently-transmitted chat messages stored in chat data 312. Administration module 302 transmits chat interface 204 to each of computer 502, tablet computer 504, and smartphone 506. Each of computer 502, tablet computer 504, and smartphone 506 displays updated chat interface 204, in the form of updated chat interface display 602, on an associated audiovisual display device.

FIG. 6 illustrates exemplary chat interface display 602, according to an embodiment. According to embodiments, chat interface display 602 comprises chat column 604, participant panel 606, information panel 608, and "Create New Thread Topic" button 610. Although chat column 604, participant panel 606, information panel 608, and "Create New Thread Topic" button 610 are shown and described in a particular configuration, embodiments contemplate chat columns 604, participant panels 606, information panels 608, interaction buttons, and/or other data in various configurations and placements, according to particular needs. According to embodiments, communication devices participating in chat space 202 may transmit chat messages to other communication devices, which the one or more cloud systems 110 and participating communication devices may display using chat interface display 602.

According to embodiments, chat column 604 occupies the majority of the center of chat interface display 602. Although chat column 604 is shown and described as occupying the center portion of chat interface display 602, embodiments contemplate chat interface display 602 displaying chat column 604 in any configuration. In embodiments, chat column 604 displays chat messages which the communication devices have transmitted to administration module 302 using network 130. In addition, the communication devices may choose to send chat messages to every other participating communication device in chat interface 204; alternatively, communication devices may pre-select one or more specific communication device recipients before sending chat messages.

According to embodiments, participant panel 606 on the left side of chat interface display 602 displays a visual representation of the communication devices currently participating in chat space 202 (in this example, computer 502, tablet computer 504, and smartphone 506). In an embodiment, chat interface display 602 may identify participating communication devices by the names of the users associated with the communication devices (such as "Jane Doe"), or by identifying the communication devices themselves (such as "Tablet computer user," "Smartphone user," and the like). In an embodiment, administration module 302 may assign names to the communication devices displayed in participant panel 606 using information contained in communication systems data 310. Chat interface display 602 may display the names of the communication devices participating in chat space 202 under, or in association with, each individual chat message displayed in chat interface display 602.

According to embodiments, information panel 608 illustrated on the right side of chat interface display 602 displays a summary of chat interface information, including the name of chat space 202 (for example, as illustrated in FIG. 6, "Any space") and the public/private status of chat interface display 602 (for example, as illustrated in FIG. 6, "This space is public"). Although FIG. 6 illustrates information panel 608 occupying the right side of chat interface display 602, embodiments contemplate chat interface display 602 displaying information panel 608 in any configuration. In other embodiments, information panel 608 displays icons representing the communication devices currently participating in chat space 202.

Continuing the example, at action 406, administration module 302 continually monitors for requests from each of computer 502, tablet computer 504, and smartphone 506 to generate one or more threads. According to embodiments, chat interface 204 may display "Create New Thread Topic" button 610. According to embodiments, when a user associated with one or more communication devices actuates "Create New Thread Topic" button 610, the communication device transmits a request to administration module 402 to generate a new thread.

Continuing the example, the user associated with smartphone 506 actuates "Create New Thread Topic" button 610, and smartphone 506 transmits a request to administration module 302 to generate a new thread. In other embodiments, any of the one or more communication devices may transmit a request to generate a new thread to administration module 302.

Continuing the example, administration module 302 stores the request to generate a new thread transmitted by smartphone 506, as well as the identity of smartphone 506, in thread data 314. Thread module 306 accesses thread data 314 and generates a thread settings interface, which will allow smartphone 506 to specify various parameters regarding how the thread will operate, such as, for example, which other communication devices are permitted to participate in the thread. Administration module 302 transmits the thread settings interface to smartphone 506. Smartphone 506 displays the thread settings interface on its audiovisual display device as thread settings interface display 702.

Figure 7:
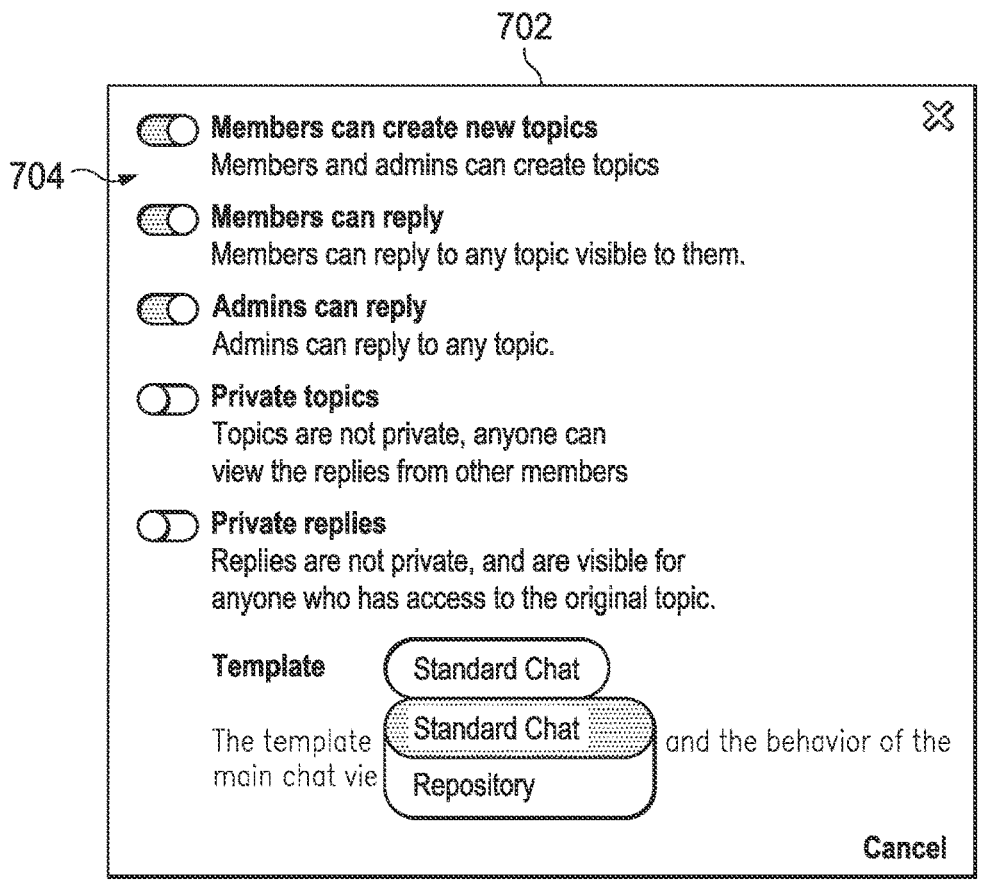
FIG. 7 illustrates an exemplary thread settings interface display, according to an embodiment.

FIG. 7 illustrates exemplary thread settings interface display 702, according to an embodiment. Thread settings interface display 702 specifies one or more thread parameters 704 in accordance with which the new thread will operate. In an embodiment, thread settings interface display 702 enables a communication device to choose which other communication devices will be permitted to participate in the thread, and to configure whether communication devices participating in the thread may request the creation of sub-threads within that thread (wherein each sub-thread functions according to its own thread parameters and with its own set of participating communication devices), whether communication devices may reply to chat messages transmitted in the thread, whether communication devices permitted to join the thread may invite other communication devices to join the thread, and the like. Although particular thread parameters 704 are shown and described, embodiments contemplate thread settings interface display 702 configuring any thread parameters 704 related to the to-be-created thread, according to particular needs.

According to embodiments, a communication device may use thread settings interface display 702 to choose one or more of the following exemplary settings that determine the manner in which the new thread will operate: (1) whether the communication device can create one or more additional sub-thread chat topics from within the thread, wherein each sub-thread has unique thread parameters and communication device participants; (2) whether other communication devices invited to participate in the thread can create one or more additional sub-threads from within the thread; (3) whether such additional sub-threads are viewable by or hidden from each of the one or more communication devices participating in chat space 202; (4) which communication devices are permitted to send chat messages within the additional sub-threads; and/or (5) which communication devices may view the chat messages sent by other communication devices within the additional sub-threads.

According to embodiments, a communication device may use thread settings interface display 702 to specify the creation of a one-to-any thread (in which the communication device can create one or more additional threaded chat topics from within the thread but no other participating communication devices may create additional sub-threads within the thread); an any-to-any thread (in which all participating communication devices can create one or more additional sub-threads from within the thread that are visible to all communication devices); an any-to-one thread (in which all communication devices can create one or more additional private sub-threads that are visible only to (1) communication devices invited to participate in the private sub-threads and (2) the communication device that initially created the larger thread); and/or a one-to-one thread (in which all communication devices can create one or more additional private sub-threads that are visible only to communication devices invited to participate in the sub-threads, potentially excluding the communication device that initially created the larger thread if that communication device is not invited to the private sub-threads).

According to embodiments, thread settings interface display 702 may comprise one or more thread templates. One or more communication devices may use one or more thread templates to load pre-configured thread parameters 704 and to quickly configure one or more threads.

Continuing the example, smartphone 506 selects, from thread settings interface display 702, to generate a new thread in which only smartphone 506 and tablet computer 504 will participate, prohibiting computer 502 communication device from participating in the new thread. Smartphone 506 transmits the thread settings parameters to administration module 302, which stores the thread settings parameters in thread data 314.

Continuing the example, at action 408, thread module 306 accesses the thread settings parameters stored in thread data 314 and generates thread interface 206. In this example, administration module 302 transmits thread interface 206 only to smartphone 506 and tablet computer 504 communication devices. Smartphone 506 and tablet computer 504 each display thread interface 206 in the form of thread interface display 802 on their audiovisual display devices. Each of smartphone 506 and tablet computer 504 may display either chat interface display 602 or thread interface display 802 on associated audiovisual display devices, and may permit switching back and forth between chat interface display 602 or thread interface display 802 in response to input from one or more associated users.

FIG. 8 illustrates exemplary thread interface display 802, according to an embodiment. According to embodiments, thread interface display 802 comprises thread chat column 804, thread participant panel 806, and thread information panel 808. Although thread chat column 804, thread participant panel 806, and thread information panel 808 are shown and described, embodiments contemplate thread chat columns 804, thread participant panels 806, thread information panels 808, and/or other data of various configurations and placements, according to particular needs. According to embodiments, communication devices participating in a particular thread may transmit chat messages to other communication devices participating in that particular thread, which the one or more cloud systems 110 may display using thread interface display 802 and/or thread chat column 804.

According to embodiments, thread chat column 804 occupies the majority of the center of thread interface display 802. Although thread chat column 804 is shown and described as occupying the center portion of thread interface display 802, embodiments contemplate thread interface display 802 displaying thread chat column 804 in any configuration, according to embodiments. Continuing the example, thread chat column 804 displays chat messages which smartphone 506 and tablet computer 504 communication devices have transmitted to administration module 302 using network 130.

According to embodiments, thread participant panel 806 on the left side of thread interface display 802 displays a visual representation of the communication devices currently participating in the thread. Thread participant panel 806 may identify participating communication devices by the names of the users associated with the communication devices, or by identifying the communication devices themselves. In an embodiment, administration module 302 may assign names to the communication devices displayed in thread participant panel 806 using information contained in communication systems data 310. Thread interface display 802 may display the names of the communication devices participating in the thread under, or in association with, each individual chat message displayed in thread chat column 804.

According to embodiments, thread information panel 808 illustrated on the right side of thread interface display 802 displays a summary of thread interface information, including the name of the thread (for example, as illustrated in FIG. 8, "Any space private thread") and the public/private status of thread interface display 802 (for example, as illustrated in FIG. 8, "This space is private". Although FIG. 8 illustrates thread information panel 808 occupying the right side of thread interface display 802, embodiments contemplate thread interface display 802 displaying thread information panel 808 in any configuration. In embodiments, thread information panel 808 displays circular icons representing the communication devices currently participating in the particular thread.

Continuing the above example, smartphone 506 and tablet computer 504 participating in the thread transmit chat messages to administration module 302 using network 130 and communication links 140-148. At action 410, administration module 302 stores each chat message in thread data 314 of database 114. Thread module 306 accesses thread data 314, and generates updated thread interface 206 containing the recently-transmitted chat messages stored in thread data 314. Administration module 302 transmits updated thread interface 206 to smartphone 506 and tablet computer 504 communication devices, maintaining the privacy of the thread by prohibiting computer 502 communication device from participating. Each of tablet computer 504 and smartphone 506 display updated thread interface 206 on associated audiovisual display devices in the form of updated thread interface display 802 displaying the new recently-transmitted chat messages on thread chat column 804.

Concluding the example, cloud system 110 return to action 406 and continues to monitor for thread requests at action 406, generate threads at action 408, and store thread data in database 114 at action 410 for the duration that computer 502, tablet computer 504, and smartphone 506 participate in chat space 202. When computer 502, tablet computer 504, and smartphone 506 disconnect from chat space 202, cloud system 110 terminates method 400.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
two or more communication devices; and
a computer coupled with a database and comprising a processor and memory, the computer configured to generate a chat space in which the two or more communication devices associated with two or more users participate by:
receiving a request to generate a chat space between the two or more communication devices associated with the two or more users;
generating the chat space in response to receiving the request;
storing in the computer memory identification information for each of the two or more communication devices;
transmitting the chat space to the two or more communication devices associated with the two or more users, wherein the chat space is displayed using a chat interface;
requesting, by a user associated with one of the two or more communication devices participating in the chat space, a new private thread, and transmitting the request to create the new private thread;
generating the new private thread, wherein the new private thread is configured using thread parameters selected by the user and by selection of a thread template by the user; and
displaying a new thread interface by two or more communication devices selected by the user to participate in the new private thread.

2. The system of claim 1, further comprising:
generating, by the chat interface or the new thread interface, in response to a selection, an additional thread interface corresponding to an additional thread topic.

3. The system of claim 1, further comprising:
receiving a command by at least one of the selected two or more communication devices;
in response to the receiving the command, switching the display of the at least one of the selected two or more communication devices between the chat interface or the new thread interface.

4. The system of claim 1, wherein the new thread interface comprises a chat column, a participant panel and a thread information panel.

5. The system of claim 4, further comprising:
displaying, in the thread information panel, icons representing communication devices currently participating in the new private thread.

6. The system of claim 1, further comprising:
exchanging, by the selected two or more communication devices participating in the new private thread, one or more of chat messages, images, saved files and documents.

7. A computer-implemented method, comprising:
generating, using a computer coupled with a database and comprising a processor and memory, a chat space in which two or more communication devices associated with two or more users participate;
receiving a request to generate a chat space between the two or more communication devices associated with the two or more users;
generating the chat space in response to receiving the request;
storing in the computer memory identification information for each of the two or more communication devices;
transmitting the chat space to the two or more communication devices associated with the two or more users, wherein the chat space is displayed using a chat interface;
requesting, by a user associated with one of the two or more communication devices participating in the chat space, a new private thread, and transmitting the request to create the new private thread;
generating the new private thread, wherein the new private thread is configured using thread parameters selected by the user and by selection of a thread template by the user; and
displaying a new thread interface by two or more communication devices selected by the user to participate in the new private thread.

8. The computer-implemented method of claim 7, further comprising:
generating, by the chat interface or the new thread interface, in response to a selection, an additional thread interface corresponding to an additional thread topic.

9. The computer-implemented method of claim 7, further comprising:
receiving a command by at least one of the selected two or more communication devices;
in response to the receiving the command, switching the display of the at least one of the selected two or more communication devices between the chat interface or the new thread interface.

10. The computer-implemented method of claim 7, wherein the new thread interface comprises a chat column, a participant panel and a thread information panel.

11. The computer-implemented method of claim 10, further comprising:
displaying, in the thread information panel, icons representing communication devices currently participating in the new private thread.

12. The computer-implemented method of claim 7, further comprising:
exchanging, by the selected two or more communication devices participating in the new private thread, one or more of chat messages, images, saved files and documents.

13. A non-transitory computer-readable storage medium embodied with software, the software when executed configured to:
receive, using a computer coupled with a database and comprising a processor and memory, a request to generate a chat space in which two or more communication devices associated with two or more users participate;
generate the chat space in response to receiving the request;
store in the computer memory identification information for each of the two or more communication devices;
transmit the chat space to the two or more communication devices associated with the two or more users, wherein the chat space is displayed using a chat interface;
request, by a user associated with one of the two or more communication devices participating in the chat space, a new private thread, and transmitting the request to create the new private thread;
generate the new private thread, wherein the new private thread is configured using thread parameters selected by the user and by selection of a thread template by the user; and
display a new thread interface by two or more communication devices selected by the user to participate in the new private thread.

14. The non-transitory computer-readable storage medium of claim 13, wherein the software when executed is further configured to:
generate, by the chat interface or the new thread interface, in response to a selection, an additional thread interface corresponding to an additional thread topic.

15. The non-transitory computer-readable storage medium of claim 13, wherein the software when executed is further configured to:
receive a command by at least one of the selected two or more communication devices;
in response to the receiving the command, switch the display of the at least one of the selected two or more communication devices between the chat interface or the new thread interface.

16. The non-transitory computer-readable storage medium of claim 13, wherein the new thread interface comprises a chat column, a participant panel and a thread information panel.

17. The non-transitory computer-readable storage medium of claim 16, wherein the software when executed is further configured to:
display, in the thread information panel, icons representing communication devices currently participating in the new private thread.

* * * * *